United States Patent [19]

Herzl

[11] Patent Number: 4,852,409
[45] Date of Patent: Aug. 1, 1989

[54] SIGNAL RECOVERY SYSTEM FOR MASS FLOWMETER

[75] Inventor: Peter J. Herzl, Morrisville, Pa.

[73] Assignee: Fischer & Porter Company, Warminster, Pa.

[21] Appl. No.: 204,565

[22] Filed: Jun. 9, 1988

[51] Int. Cl.$^4$ .............................................. G01F 1/84
[52] U.S. Cl. .............................................. 73/861.38
[58] Field of Search ........................ 73/861.37, 861.38

[56] References Cited

U.S. PATENT DOCUMENTS

| | | | |
|---|---|---|---|
| 3,276,257 | 10/1966 | Roth | 73/861.38 |
| 3,355,944 | 12/1967 | Sipin | 73/861.38 |
| 4,311,054 | 1/1982 | Cox et al. | 73/861.38 |
| 4,655,089 | 4/1987 | Kappelt et al. | 73/861.38 |
| 4,660,421 | 4/1987 | Dahlin et al. | 73/861.38 |
| 4,756,197 | 7/1988 | Herzl | 73/861.38 |

FOREIGN PATENT DOCUMENTS

88/03261 5/1988 PCT Int'l Appl. .............. 73/861.38

OTHER PUBLICATIONS

Plache in Mechanical Engineering, 3/79, "Coriolis Gyroscopic Flow Meter", pp. 36-41.

Primary Examiner—Herbert Goldstein
Attorney, Agent, or Firm—Michael Ebert

[57] ABSTRACT

A mass flowmeter of the Coriolis-type having a primary wherein fluid being metered is conducted through a flow tube in the form of a double loop whose loops are excited by a driver to vibrate in phase opposition at the resonance frequency of the tuning fork. Because fluid passing through the flow tube is subjected to Coriolis forces, the vibrating loops are caused to torsionally oscillate in accordance with the mass flow of the fluid. A pair of sensors mounted on the respective loops sensor signals which are applied to a differential amplifier in a signal recovery system forming the secondary of the meter to produce an output voltage that is a function of mass flow. This output voltage is applied to the input of a microcontroller coupled to an indicator providing a reading of mass flow. The meter is calibrated so that at the resonance frequency under normal operating conditions it produces a reading proportional to mass flow. Because of changes in the density of the fluid and other variables encountered under actual operating conditions which bring about deviations in the resonance frequency and in the amplitude of the torsional oscillations, also applied to the microcontroller are frequency and amplitude signals which reflect these deviations. The microcontroller, in response to these signals, acts to correct the mass flow indication to provide an accurate mass flow reading.

10 Claims, 4 Drawing Sheets

SIGNAL RECOVERY SYSTEM FOR MASS FLOWMETER

BACKGROUND OF INVENTION

1. Field of Invention

This invention relates generally to a Coriolis-type meter whose primary is of the double-loop type in which the loops are so anchored as to define a tuning fork in which the loops are free to vibrate in phase opposition and to torsionally oscillate, and more particularly to a signal recovery system forming the secondary of this meter and functioning to correct for deviations arising in the course of operation to provide an accurate reading of mass flow.

2. Status of Art

A mass flow rate meter is an instrument for measuring the mass of a fluid flowing through a conduit per unit time. Most meters for this purpose measure a quantity from which the mass can be inferred, rather than measuring mass directly. Thus, one can measure the mass flow rate with a volumetric flowmeter by also taking into account pressure, temperature and other parameters to compute the mass.

A Coriolis-type mass flowmeter, also called a Coriolis/Gyroscopic meter, provides an output directly proportional to mass flow, thereby obviating the need to measure pressure, temperature, density and other parameters. In this type of meter, there are no obstacles in the path of the flowing fluid, and the accuracy of the instrument is unaffected by erosion, corrosion or scale build-up in the flow sensor.

The theory underlying a Coriolis-type mass flowmeter and the advantages gained thereby are spelled out in the article by K.O. Plache, "Coriolis/Gyroscopic Flow Meter" in the March 1979 issue of Mechanical Engineering, pages 36 to 39.

A Coriolis force is generally associated with a continuously rotating system. Thus, the earth's rotation causes winds from a high pressure region to spiral outwardly in a clockwise direction in the northern hemisphere, and in the counterclockwise direction in the southern hemisphere. And a person moving on a merry-go-round will experience a lateral force and must lean sideways in order to move forward when walking outward along a radius.

A Coriolis force and precession in a gyroscope arise from the same principle. In a gyroscope, when a torque is applied at right angles to the axis of rotor spin, this will produce a precessional rotation at right angles to the spin axis and to the applied torque axis. A Coriolis force involves the radial movement of mass from one point on a rotating body to a second point, as a result of which the peripheral velocity of the mass is caused to accelerate. This acceleration of the mass generates a force in the plane of rotation which is normal to the instantaneous radial movement.

The Smith et al. U.S. Pat. No. 4,491,025 discloses a flowmeter in which the fluid whose mass is to be measured flows serially through two parallel U-shaped tubes which together function as the tines of a tuning fork.

Because a double-loop Coriolis-type meter functions as a tuning fork, much less power is required to oscillate the two loops at their natural frequency than would be required to oscillate one loop alone. When the two loops vibrate as a tuning fork with respect to an anchored center at the junction of the two loops, they will alternately come close together to a minimum spacing and then separate to a maximum spacing; hence the angular velocity vector for one loop will always be opposite to the angular velocity vector for the other loop. And because the flow through the two loops is the same, the loops will be subjected to opposing torques by reason of the opposite angular velocity vectors. As a consequence, the two loops are caused alternately to twist toward and away from each other.

A double-loop tuning fork configuration provides a more stable operation than a single loop mass flowmeter; for as the mass of one loop varies due to increased fluid density, so will the mass of the other loop. This results in a dynamically balanced pair of loops and a substantially decreased sensitivity to external vibratory forces.

However, because the loops of the tuning fork are anchored at their center which is the junction of the two loops as well as the inlet and outlet ends, such anchoring strongly inhibits deflection of the loops. As a result, velocity sensors of the type used in the prior art are not sufficiently sensitive to provide an adequate signal for mass flow measurement.

In my patent U.S. Pat. No. 4,746,312, a mass flowmeter of the Coriolis type is disclosed in which the fluid to be metered is conducted through a flow tube which is coiled to form a double loop. The tube is anchored at its inlet and outlet ends and also at its center which is the junction of the two loops to define a tuning fork in which the identical loops on either side of the anchored center function as tines that are free to vibrate as well as to twist. An electromagnetic driver mounted at the vertex of the double loop is electrically energized to cause the loops" to vibrate in phase opposition at the natural resonance frequency of the tuning fork. The fluid passing through the double loop is subjected to Coriolis forces, thereby causing the vibrating loops to torsionally oscillate in accordance with the mass flow of the fluid. Capacitance sensors are symmetrically mounted on the respective loops to yield signals having a difference in magnitude and phase that depends on the amplitude of the torsional oscillations, these signals being applied in a secondary to a differential amplifier whose output is a function of the mass flow of the fluid.

In a double loop mass flowmeter of the type disclosed in my prior U.S. Pat. No. 4,746,312 application, in order to attain a zero output at no flow, the sensor signals must both be of identical wave shape and amplitude and be exactly in phase. Only under these conditions do the signals cancel out in the differential amplifier.

However, there are many disturbances which arise in the course of operation which adversely affect the desired relationship between the two sensor signals. In a meter of the double-loop Coriolis type, the cabling between the primary of the meter and the secondary electronics may bring about phase shifts between the two sensor signals, resulting in an incorrect mass flow reading. Also, the resonance frequency may change due to piping stresses, changes in the density of the fluid being metered, mechanical changes caused by the coating on the flow tube, as well as pressure and temperature changes. These may cause minor phase shifts between the sensor signals and result in an error in the mass flow reading.

SUMMARY OF INVENTION

In view of the foregoing the main object of this invention is to provide a double-loop, Coriolis-type mass flowmeter which yields highly accurate mass flow readings.

More particularly, an object of this invention is to provide in the secondary of a double-loop meter of this type a signal recovery system which so processes the signals produced by the sensors coupled to the loops of the primary as to produce readings which are proportional to the mass flow throughout a broad operating range.

Also an object of the invention is to provide a secondary of relatively simple design which operates efficiently and reliably.

Yet another object of the invention is to provide density as well as mass flow readings.

Briefly stated, these objects are attained in a mass flowmeter of the Coriolis type having a primary wherein fluid being metered is conducted through a flow tube in the form of a double loop anchored at its inlet and outlet ends and also at its center to define a tuning fork in which the loops on either side of the center function as tines that are free to twist as well as to vibrate. The loops are excited by a driver to vibrate in phase opposition at the resonance frequency of the tuning fork. Because fluid passing through the flow tube is subjected to Coriolis forces, the vibrating loops are caused to torsionally oscillate in accordance with the mass flow of the fluid. A pair of sensors mounted on the respective loops yield sensor signals having a difference in magnitude and phase that depends on the amplitude of the torsional oscillations. These sensor signals are applied to a differential amplifier in a signal recovery system forming the secondary of the meter to produce an output voltage that is a function of mass flow. This output voltage is applied to the input of a microcontroller coupled to an indicator providing a reading of mass flow. The meter is calibrated so that at the resonance frequency under normal operating conditions it produces a reading proportional to mass flow. Because of changes in the density of the fluid and other variables encountered under actual operating conditions which bring about deviations in the resonance frequency and in the amplitude of the torsional oscillations, also applied to the microcontroller are frequency and amplitude signals which reflect these deviations. The microcontroller, in response to these signals, acts to correct the mass flow indication to provide an accurate mass flow reading.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figures 1, 2:
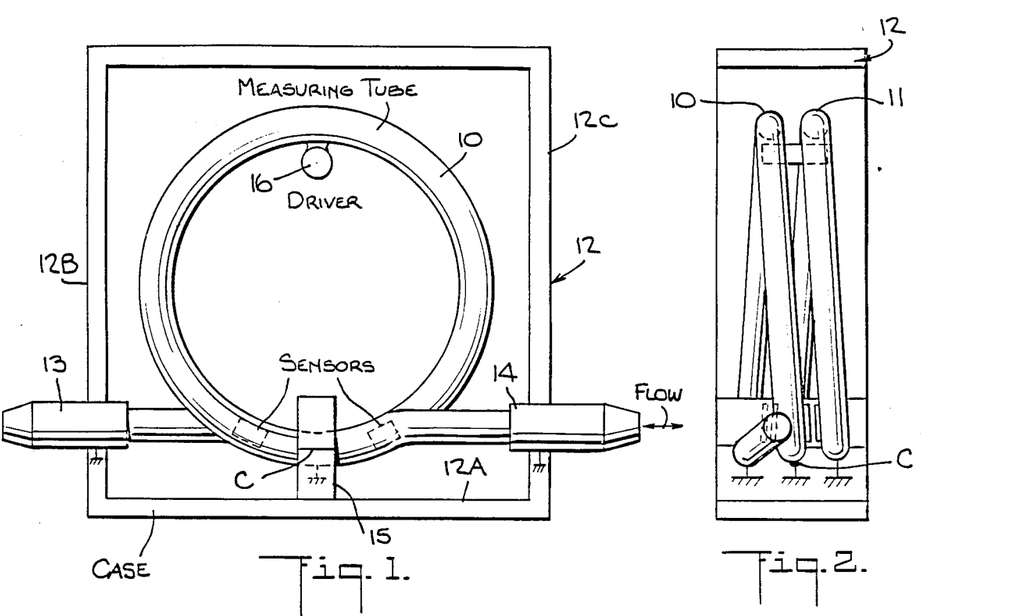
FIG. 1 is an end view of a double-loop Coriolis type mass flowmeter in accordance with the invention.
FIG. 2 is a side view of the meter.

The Meter Primary:

Referring now to FIGS. 1 and 2, there is shown a Coriolis-type mass flowmeter in accordance with the invention which includes a metal pipe of stainless steel or other material that is non-reactive with respect to the fluid being metered and is capable of withstanding fluid pressure. This pipe is coiled to form a double loop constituted by identical circular loops 10 and 11 having the same diameter.

The double loop is supported within a rigid, stationary rectangular case or frame 12 having a base 12A and parallel sides 12B and 12C. Mass flow may be measured in either flow direction in the pipe. But for purposes of illustration, we shall treat fitting 13 coupled to one end of the pipe which passes through an opening in side 12B and is welded thereto as the inlet fitting, and fitting 14 which passes through an opening in side 12C and is welded thereto as the outlet fitting. Hence the inlet and outlet of the double loop pipe are anchored on the frame.

The center C of the double loop which is the junction of loops 10 and 11 is anchored on the frame by a stud 15 which is welded both to base 12A of the double loop center.

The double loop configuration in which the inlet and outlet ends as well as the center are anchored creates a tuning fork whose tines are constituted by identical loops 10 and 11. These are free to vibrate in phase opposition at the natural frequency of the tuning fork. Because the vibrating loops are subjected to opposing Coriolis force torques when a fluid flows therethrough, loops 10 and 11 are caused alternately to twist toward and away from each other.

Figures 3, 4:
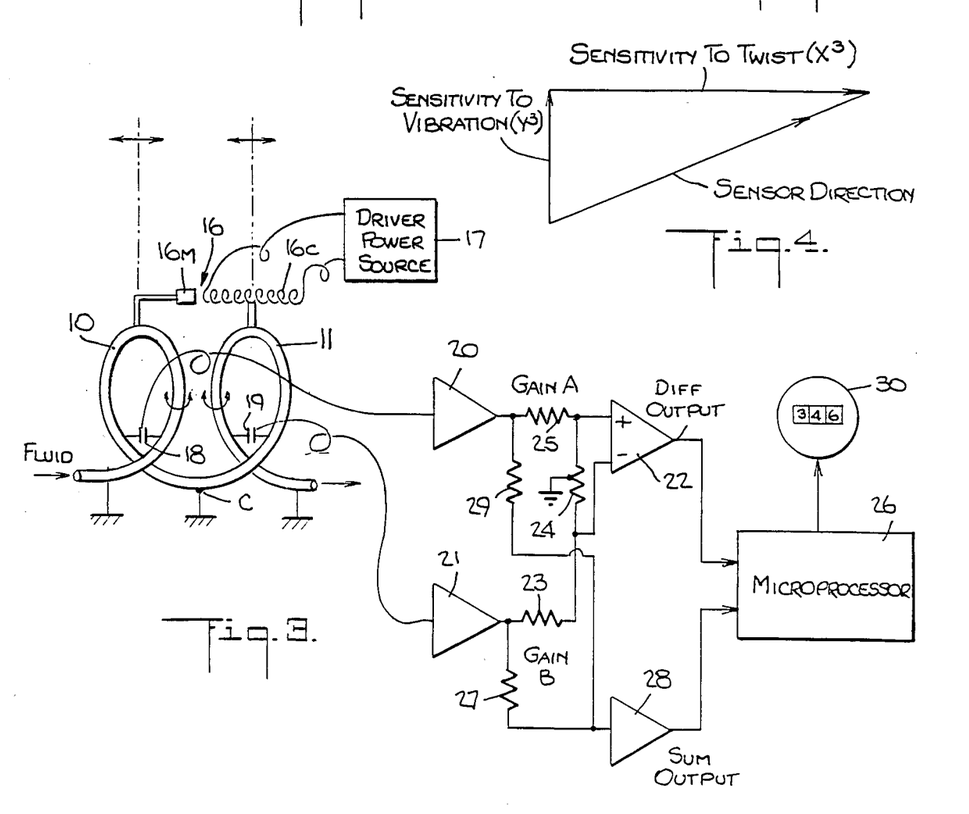
FIG. 3 schematically illustrates the meter and the measuring circuit associated with the loop capacitance sensors.
FIG. 4 is a vector diagram showing the vectors which determine the sensor displacement.

Mounted at the vertex of the double loop is an electromagnetic driver 16 which is energized by an external alternating power source 17, as shown in FIG. 3, to cause the tuning fork loops to vibrate at a frequency corresponding to the natural resonance of the fork, whereby two loops swing back and forth with respect to the center in phase opposition.

Driver 16, as shown in FIG. 3, may take the form of a permanent magnet 16M cooperating with a coil 16C which is excited by the power source 17 to cause the magnet to be alternately attracted to the coil and to be repelled thereby at a frequency corresponding to the resonance frequency of the tuning fork. Any known form of driver may be used for this purpose.

Mounted on loop 10 at a point intermediate the anchored center C and a point 45 degrees from the center is a capacitance sensor 18 having a pair of plates, one of which is secured to one leg of the loop and the other to the other leg, the plates of the capacitance sensor being insulated from the metal legs. Likewise, mounted on loop 11 at a corresponding position is a capacitance sensor 19, so that the pair of sensors are symmetrically mounted on the double loop.

The capacitance of a capacitor formed by two conducting plates separated by a dielectric is determined by the equation $$C = KA$$

where

C is the total capacitance

K is the dielectric constant of the material between the plates (which in the case of the sensors 18 and 19 is air)

A is the areas of the plates d is the distance between the plates

In the case of sensor 18, one plate thereof is mounted on the leg of loop 10 which is anchored on center C, and the other plate 19 mounted on the other leg of the same loop anchored at the inlet end 13. The plates of sensor 19 have a corresponding relationship to the legs of loop 11.

Inasmuch as each loop vibrates back and forth and oscillates torsionally, the spacing between the plates of the capacitance sensor varies to an extent determined by the vector resultant of the vibratory and torsional movements. The change in capacitance experienced by each sensor is converted into a corresponding voltage signal by connecting the capacitor to a direct-current voltage source in series with a current limiting resistor, in a manner disclosed in my copending case.

In the secondary disclosed in my copending case, the signal voltage sensor 18 is applied to a pre-amplifier 20 and that from sensor 19 to a pre-amplifier 21. The output of pre-amplifier 21 is connected to the negative input of a differential amplifier 22 through a fixed resistor 23 in series with a variable gain-control resistor 24. The output of pre-amplifier 20 is connected to the positive input of differential amplifier 22 through a fixed resistor 25. The output of differential amplifier 22 which represents the difference between the amplitudes of the sensor signals is applied to a microprocessor 26.

The output of pre-amplifier 21 is also applied through a fixed resistor 27 to the input of a summing amplifier 28 to which is also applied through a fixed resistor 29 the output of pre-amplifier 20. Hence the output of summing amplifier 28 is the sum of the sensor signals, and this is applied to another input of microprocessor 26.

Microprocessor 26, on the basis of the sum and difference signal data entered therein, calculates the mass flow rate of fluid flowing through the flow loop to provide a digital value representing the mass flow rate. This is displayed on visual indicator 30.

The sensitivity of the capacitance sensor to twist varies as the cube of the twist displacement ($X^3$) and its sensitivity to vibratory oscillations varies as the cube of the vibratory displacement ($Y^3$). However, these displacements, which take place concurrently, as shown in the vector diagram in FIG. 4, are at right angles to each other. Hence the actual direction taken by the capacitance sensor is the vector resultant of $X^3$ and $Y^3$. To obtain maximum sensitivity of the capacitance sensor to torsional oscillation—for it is this oscillation that provides a mass flow reading—the ratio of the twist vector to the vibration vector must be such as to provide optimum displacement of the capacitance sensor. This takes place when the sensor is located fairly close to the anchor center C and well below 45 degrees on the loop from this center.

The Signal Recovery System:

A signal recovery system in accordance with the invention takes the place of the secondary shown in FIG. 3 and operates in conjunction with a double-loop primary of the type shown in this figure. While this system is particularly applicable to a Coriolis-type flowmeter of the type shown in my copending application which employs a pair of capacitive sensors, it is also applicable to a meter having other types of displacement sensors such as those of the strain gauge type. The pair of sensors on the two loops of the meter shall hereinafter be identified as sensors $S_1$ and $S_2$.

Figure 5:
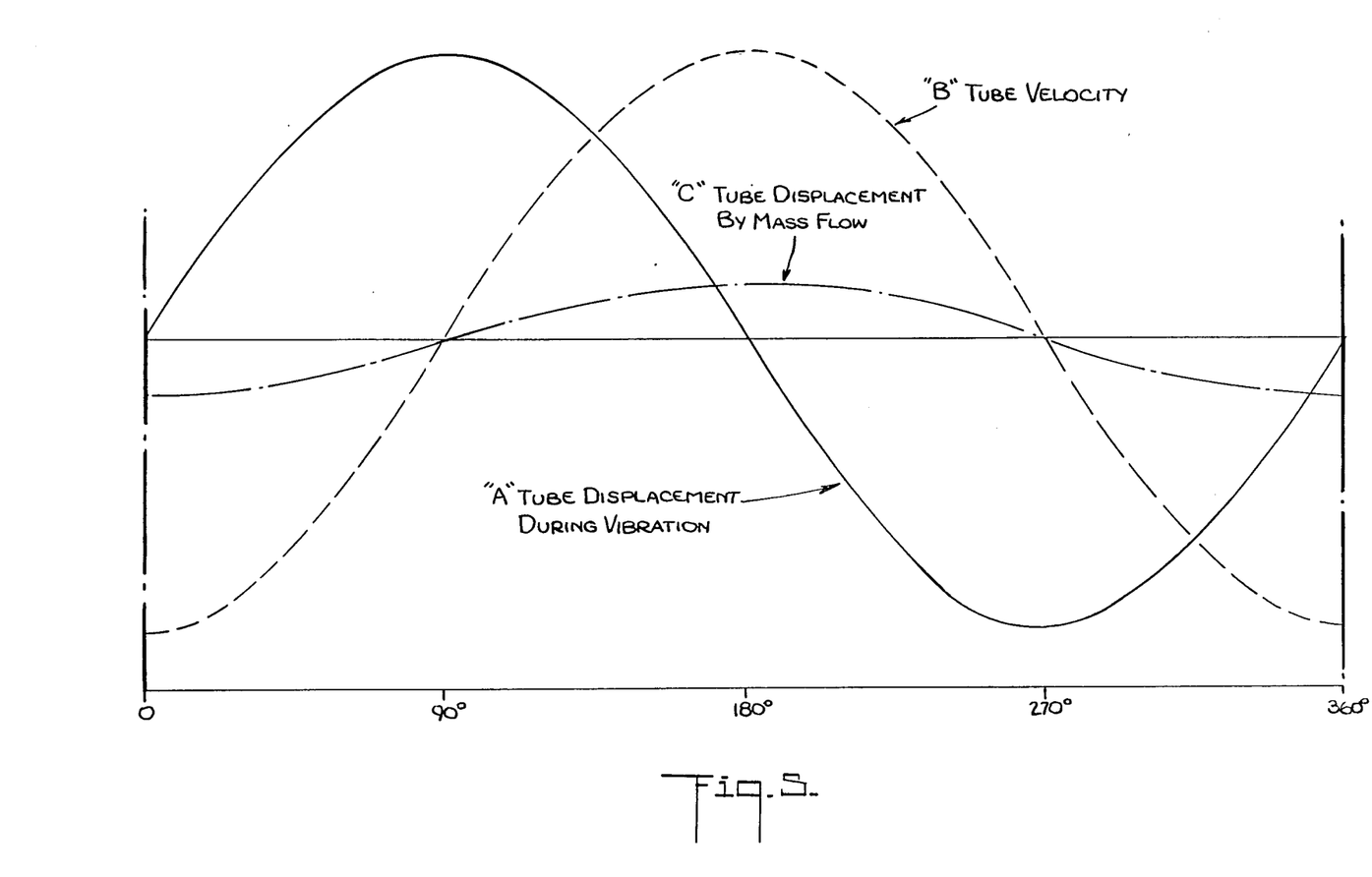
FIG. 5 shows three curves, A, B, and C, representing different characteristics of the flow tube of the meter.

Referring now to FIG. 5, the curves therein are those representing the various displacements and velocities in the vibrating loops forming the flow tube of the meter. Curve A represents the amplitude of a vibrating tube plotted against tube displacement. In the primary of the meter, the displacement of the two loops forming the flow tube are sensed by sensors $S_1$ and $S_2$; hence, the amplitude of the signals yielded by these sensors will be in accordance with curve A.

Curve B is the tube velocity curve for the same situation. It will be seen that the tube velocity curve B is displaced 90° in phase from amplitude curve A. When flow is present in the meter, the resultant Coriolis effect gives rise to a force that reaches its maximum when the tube velocities are maximum. As a consequence, the tube deflection produced by this force lies in phase with the tube velocity curve B. The deflection or displacement of the tube resulting from this force is represented by curve C which is in phase with curve B but is of smaller amplitude.

The amplitude of curve C varies as a function of mass flow and tube velocity; and its actual amplitude is very small. But in FIG. 5, the amplitude of curve C has been exaggerated for purposes of illustration. Because the force produced by the Coriolis effect is actually a torsional or twisting force, the displacement sensed by sensor $S_1$ is enlarged, and that sensed by sensor $S_2$ is concurrently reduced. This effect reverses should the flow direction reverse.

Figure 6:
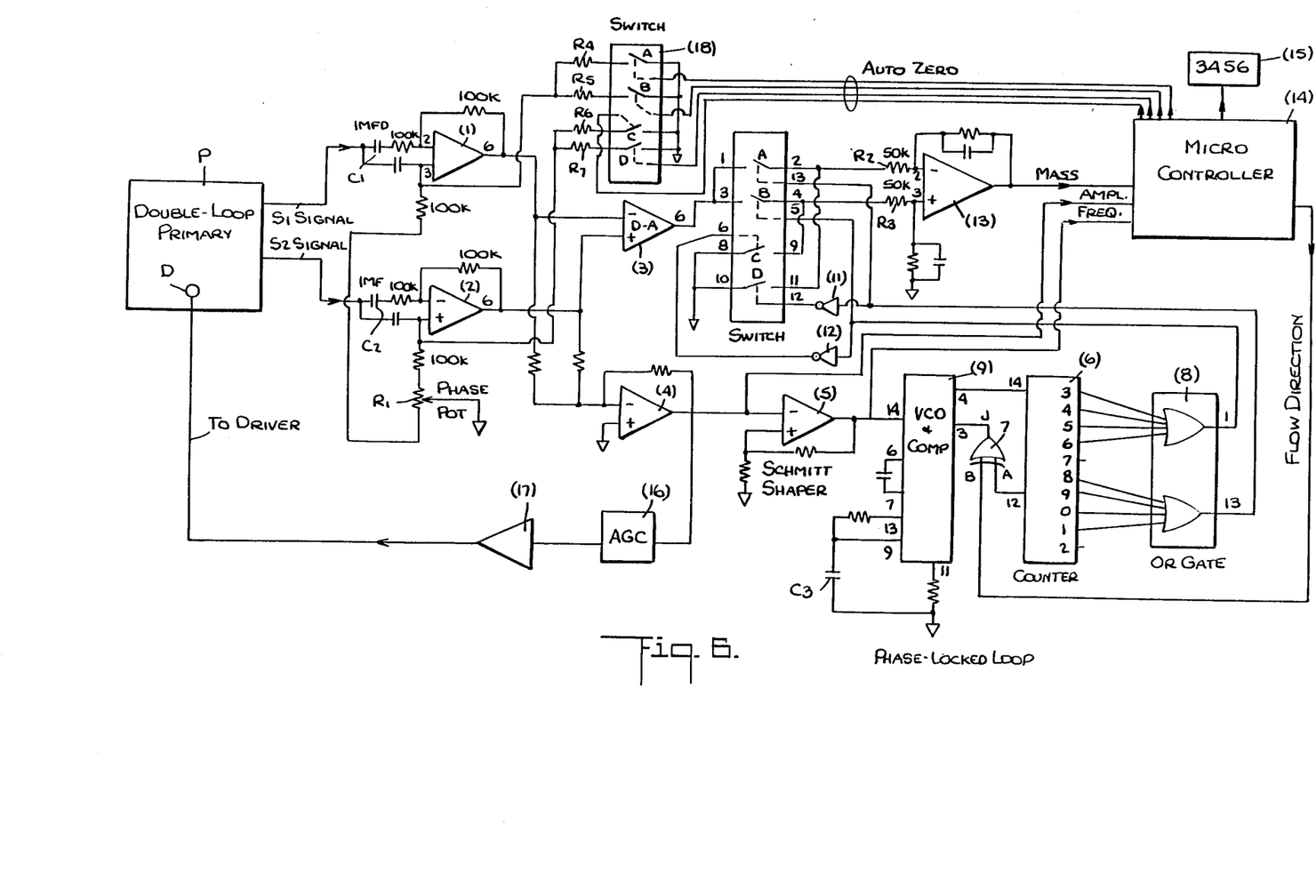
FIG. 6 is the circuit diagram of the secondary of a mass flowmeter in accordance with the invention.

Referring now to FIG. 6, it will be seen that the signals produced by sensors $S_1$ and $S_2$ in a double-loop Coriolistype primary P having a loop driver D are applied to a secondary in the form of a signal recovery system which processes these signals to yield an accurate indication of mass flow. The system is also capable of calculating the density of the fluid being metered. In this figure, the various stages of the secondary are identified by reference numerals in brackets to distinguish these stages from circuit components identified by unbracketed numbers and letters.

The signal from sensor $S_1$ is applied through the operational amplifier of a unity gain phase-shifter (1) to the inverting input of a differential amplifier (3). The signal from sensor $S_2$ is applied through the operational amplifiers of a like unity gain phase-shifter (2) into the nonreversing input of differential amplifier (3).

While in theory these two sensor signals should be in exact phase under zero mass flow conditions, minor mechanical differences in the flowmeter, the sensors, the pre-amplifiers (if such are included) and the cabling between the primary and secondary can give rise to phase shifts between the sensor signals, thereby producing an incorrect mass flow output in differential amplifier (3).

Moreover, differences in resonance frequency due to pipe stresses, material density changes in the flowmeter, mechanical changes caused by coating the tubes, as well as pressure and temperature changes and other variables could cause minor phase shifts between the two sensor signals. In a recovery system in accordance with the invention, the phase error at zero flow is adjusted without changing the amplitude of the signals from sensors $S_1$ and $S_2$. No shift in meter calibration or linearity is produced by this adjustment.

It is to be noted that the typical phase shifter composed of a resistor and capacitor network produce both a phase shift and amplitude variations. Such phase shifts are not acceptable in the context of a signal recovery system for a Coriolis-type mass flowmeter.

In simplistic terms, the output of differential amplifier (3) to whose inverting and non-inverting inputs are applied the two sensor signals represents mass flow. But in practice, in order for this to be true, there are several imperfections to be overcome. In order for differential amplifier (3) to yield a zero mass output at zero fluid flow, the signals from sensors $S_1$ and $S_2$ in this base-line condition must then be exactly equal in amplitude and phase and have identical wave shapes.

In practice, the amplitude of the sensor signals can be mechanically adjusted. Or if preamplifiers are used, the gains of these amplifiers can be adjusted so that they both yield signals of the same amplitude. Such adjustments can be carried out before the flowmeter is calibrated. However, any change in the sensitivity of sensors $S_1$ and $S_2$ taking place after calibration would alter the flowmeter calibration.

The critical adjustment in the flowmeter is phase; for as is made evident by curves A and C in FIG. 5, in curve A the tube displacement which is proportional to the sensor signal is zero when the mass signal curve C is at its maximum level. The mass output of differential amplifier (3) is therefore largely the result of the phase displacement between the signals from sensors $S_1$ and $S_2$.

In a recovery system in accordance with the invention, the unitary phase shifters (1) and (2), which include operational amplifiers, act to shift the phases of the signals from sensors $S_1$ and $S_2$ in opposite directions when a phase potentiometer $R_1$ is rotated, without having any effect on the amplitude of the signal. The amplitude also remains constant with changes in frequency as long as the frequency is high enough so that the attenuation of the IMFD capacitors $C_1$ and $C_2$ in the respective signal inputs into phase shifters (1) and (2) is negligible.

While the phase shift does change with frequency, since the components associated with the integrated circuit operational amplifiers forming phase shifters (1) and (2) are the same, the phase shift in both sensor signal channels is the same, and virtually no relative phase shift occurs between the two sensor channels.

The wave shape of the sensor signals may or may not be adjustable, depending on the structure of the sensors used. However, it is largely due to dissimilarities in sensor wave form that the output of differential amplifier (3) is not zero when the signals from both sensors $S_1$ and $S_2$ are equal in amplitude and phase.

The classical technique for detecting a signal under noise conditions of this type is to employ a phase and frequency-sensitive rectifier. The problem in the present situation is complicated by the fact that the mass signal is 90° out of phase with the sensor signals and that the operating frequency which is the resonance frequency of the tuning fork in the primary P of the flowmeter varies as a function of the density of the material flowing through the double-loop of the flow tube. The operating frequency is also different with different size flowmeters. It would be desirable, therefore, that the same secondary electronic system work with different primaries without the need for precise readjustments for this purpose.

As pointed out previously, conventional phase shifters tend to change their phase shift with frequency. In a system in accordance with the invention, a circuit is used which shifts the reference frequency used in the rectifier 90° (other angles are possible). It requires no adjustment and maintains an accurate 90° phase shift over a very large frequency range. Nor does it call for precision analog components such as capacitors.

Figures 7, 8:
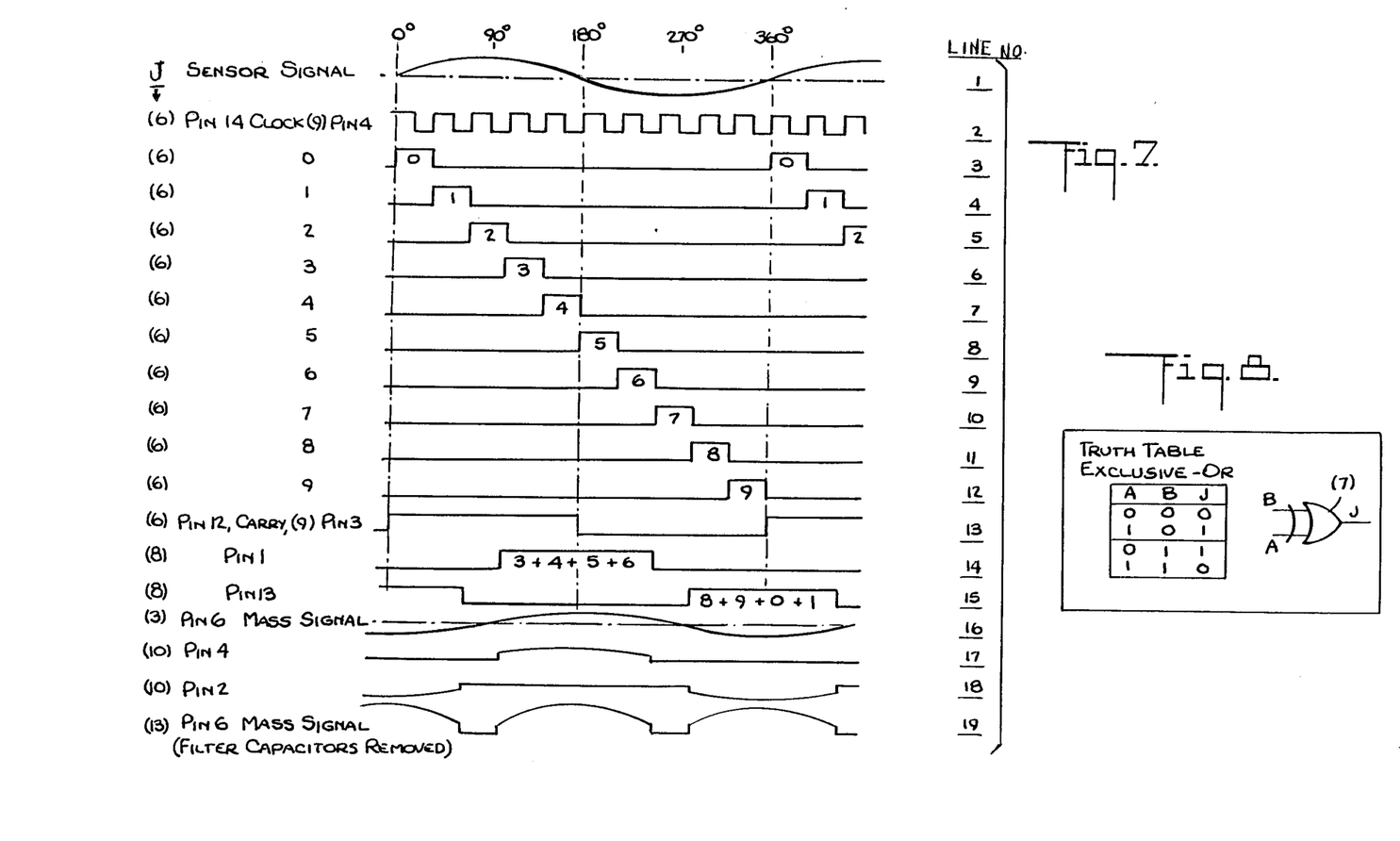
FIG. 7 in lines 1 to 19 illustrates the timing and wave shapes of the secondary.
FIG. 8 is a logic truth table for one of the components included in the secondary.

FIG. 7 illustrates the timing and wave shapes of the signal recovery system shown in FIG. 6. The heart of the system is an integrated circuit "Phase-Locked-Loop" (9) which in practice may be a CD4046B integrated circuit.

The sensor signal outputs of the operational amplifier (1) and (2) are applied to a summing amplifier (4) whose summed output is fed to an integrated circuit Schmitt shaper (5) to produce square wave pulses at a rate in accordance with the frequency of the sensor signal. These pulses are applied to the input pin 14 of phase-locked loop (9).

Basically, a phase-locked loop consists of a voltage-controlled-oscillator or VCO and a phase comparator. In operation, the signal frequency (the resonance frequency) output of the Schmitt wave shaper (5) is connected to pin 14 of the phase-locked loop which is one of the comparator inputs. The output of this comparator which appears at pin 11 is connected through a low-pass filter including capacitor $C_3$ to the VCO whose output which appears at pin 4 of the phase-locked loop (9). This output is applied to pin 14 of an integrated circuit counter (6) which in practice may be a DC4017B unit. The carry output of counter (6) which appears at pin 12 is coupled to the second input of the comparator in the phase-locked loop (6) at pin 3 through an "Exclusive-OR" gate (7).

The phase comparator in the phase-locked loop (9) now adjusts the frequency of the VCO therein so that the frequency input at pin 3 of the comparator (which is the output from pin 12 of counter (6) is equal to the signal frequency at pin 14 of the loop.

There is another very important characteristic of the phase-locked loop, for the phase comparator therein is an edge-controlled digital memory network which drives the VCO so that no phase difference exists between the signal at pin 14 and the comparator input on pin 3. This relationship is maintained over the very large operating frequency range of the meter.

In FIG. 7, line 1, there is shown the sinusoidal sensor signal, while line 13 represents the other comparator signal input to pin 3 of phase-locked loop (9). It will be seen that these signals are exactly in phase. As previously noted, this relationship is maintained over a very broad frequency range.

Line 2 in FIG. 7 shows the VCO output of loop (9) which appears at pin 9 and is applied to pin 14 of counter 6. Lines 3 to lines 12 are the decoded 0 to 9 outputs from counter (6) which are applied to an OR gate (8). In practice, this gate may be an integrated circuit unit CD4072B.

Line 14 of FIG. 7 shows the output at pin 1 of OR gate (8), while line 15 is the output at pin 13 of this gate. It is to be noted that the outputs shown on lines 14 and 15 are exactly 90° out of phase with the sensor signal (see line 1), and are exactly in phase with the mass signal which appears on line 16. This mass signal appears at the output pin 6 of differential amplifier (3). T be gate (8) outputs at pins 1 and 13 seen on lines 14 and 15 serve to switch the outputs which appear on output pins 2 and 4 on an integrated circuit switch 10 (CD4066 unit), resulting in the wave shapes shown on lines 17 and 18.

The integrated circuit amplifier (13) to whose inverting and non-inverting inputs at pins 2 and 3 are applied the outputs, respectively, from pins 2 and 4 of switch (10) yields at pin 6 of this amplifier the output shown in line 19 of FIG. 7 when the filter capacitors are removed from this amplifier. With the filter capacitors in place, the output shown on line 19 would then simply be a DC voltage proportional to mass flow.

This mas flow output from amplifier (13) is applied to the MASS input of a microcontroller (14) which is coupled to a digital indicator (15). While counter (6) is shown as a ten stage counter, counters with more or less stages could be used in practice, and duty cycles other than the one illustrated on line 19 of FIG. 7 could be used.

The integrated circuit switch (10) couples the output of differential amplifier (3) which is a function of mass flow to amplifier (13) whose output is fed into the MASS input of microcontroller (14). Switch (10) is provided with a set of switches A, B, C and D.

It will be seen that the output of switches A and D are connected together, and that the outputs of switches B and C are also connected together. Because of an inverter (11), switch D is always in an opposite state from switch A, and because of an inverter (12), switch C is also in an opposite state from switch B. In operation, therefore, the inputs to the two 50k resistors $R_2$ and $R_3$ in the respective inputs to amplifier (13) are either connected to the output of differential amplifier (3) which yields the mass flow signal, or to ground. This is important; for leakage passing through an open switch would degrade the system's accuracy, this effect being particularly troublesome at high temperatures.

In FIG. 6, it will be seen that the A input of Exclusive-OR Gate (7) is connected to the output pin 12 of counter (6) the other input B being connected to microcontroller (14) which supplies a signal indicative of the flow direction. The carry output of counter (6) appears on line 13 of FIG. 7. The J output of the gate (7) is applied to pin 3 of the phase-locked loop (9).

As shown by the Truth Table in FIG. 8 for the Exclusive-OR Gate (7), when the microcontroller makes the B input to the gate logic 0, the J output is then in phase with the A input. But when the microcontroller makes the B input logic 1, then the J output is inverted and 180° out of phase with the A input. This phase reversal brings about a change in polarity in the DC output voltage of amplifier (13). This feature is important in that Coriolis meters are bi-directional and many voltage-to-digital converters can only accept positive voltages.

As previously noted, the phase adjusting potentiometer $R_1$ can be used to obtain a zero voltage output from the integrated circuit amplifier (13) to which the output of differential amplifier (3) is applied under zero flow conditions. However, it is desirable that microcontroller (14) be able to make fine adjustments without manual intervention, for this would allow zeroing by remote control.

To perform this function, microcontroller 14 is so coupled by four lines (Auto Zero) to an integrated circuit switch (18) having switches A to D similar to switch (10). This makes it possible either to switch resistors $R_4$ and $R_5$ to ground to produce a phase shift in one direction, or to switch resistors $R_6$ and $R_7$ to ground to effect a phase shift in another direction. These resistors are sized in a binary pattern (1, 2, etc.). More than two resistors could be used per direction to increase the phase shift and the resolution of the steps.

After microcontroller (14) selects the optimum resistors to achieve the best possible "0" output, it remembers the remainder and subtracts it from the readings obtained under actual flow conditions. The reason why the whole "0" offset is not treated as a remainder, thereby doing away with the need for switched resistors, is that the linearity of the system deteriorates when starting with a false "0." This is caused by very slight imperfections in the phase and frequency sensitive amplifiers and non-linearities caused by saturation in various compounds due to very large signal levels.

To drive driver D of primary P, the drive network for this purpose consists of summing amplifier (4) which adds the two signals from sensors $S_1$ and $S_2$, the summed output of this amplifier being applied through an AGC or automatic gain control (16) to a coil drive amplifier (17). The output of summing amplifier (4) which is a function of the amplitude of the sensor signals is also applied to the AMPL. input of microcontroller (14). In some cases, rectification may be required as the microcontroller ma only accept DC inputs.

The sum output of amplifier (4) is also applied to Schmitt shaper (5) which converts the sum output to a square wave pulses whose frequency depends on the resonance frequency of the primary, this square wave pulse output being fed to the FREQ. input of microcontroller (14).

Microcontroller (14) which receives from amplifier (13) a voltage signal as a function of mass flow corrects this voltage for the effects of any deviation from meter calibration conditions of the resonance frequency and of the amplitude of torsional oscillation, so as to yield the correct mass flow which is read out on" indicator (15).

The controller is also capable of calculating the fluid density from the change in resonance frequency occurring between calibration of the meter and actual flow conditions. This calculation can be read out in a separate indicator or by switching indicator (15) to density readout.

While there has been shown and described a preferred embodiment of a signal recovery system for mass flowmeter in accordance with the invention, it will be appreciated that many changes and modifications may be made therein without, however, departing from the essential spirit thereof.

I claim:

1. A mass flowmeter of the Coriolis-type having a primary wherein fluid being metered is conducted through a flow tube in the form of a double loop anchored at its inlet and outlet ends and also at its center to define a tuning fork in which the loops on either side of the center function as tines that are free to twist as well as to vibrate, the inlet and outlet ends extending in opposing directions the loops being excited by a driver to vibrate in phase opposition at the resonance frequency of the tuning fork, said resonance frequency being subject to change because of changes in the density of the fluid being metered and other variables encountered under actual operating conditions, the vibrating loops being caused to torsionally oscillate in accordance with the mass flow of the fluid because the fluid passing through the vibrating loops are subjected to Coriolis forces, a pair of sensors mounted on the respective loops yielding sensor signals having a magnitude and phase that depends on the amplitude of the torsional oscillations, which amplitude is subject to change because of said variables, and a secondary coupled to said primary in the form of a signal recovery system comprising:

A a differential amplifier having inverting and non-inverting inputs to which are applied the respective sensor signals to produce an output voltage that is a function of mass flow;

B a microcontroller whose output is coupled to an indicator providing a reading of mass flow, the output voltage from the differential amplifier being applied to an input of the microcontroller, said microcontroller being calibrated to produce an indication proportional to mass flow at the resonance frequency under normal operating conditions of the meter;

C means to derive from said sensor signals a frequency signal and an amplitude signal that reflect deviations in the resonance frequency and in the amplitude of the torsional oscillations resulting from said variables encountered under actual operating conditions; and D means to apply said frequency signal and said amplitude signal to said microcontroller, the microcontroller in response thereto acting to correct its mass flow indication accordingly to provide an accurate reading of mass flow.

2. A mass flowmeter as set forth in claim 1, wherein said sensors are capacitive sensors.

3. A mass flowmeter as set forth in claim 1, wherein said driver is an electromagnetic driver.

4. A mass flowmeter as set forth in claim 3, wherein said driver is energized by a summing amplifier to whose inputs are applied said sensor signals to produce in its output a summed signal that is fed through an automatic gain control to a power amplifier whose output is fed to the driver.

5. A mass flowmeter as set forth in claim 1, wherein said sensor signals are each fed to a respective input of the differential amplifier through a unity-gain phase shifter, further including means to shift the relative phases of the phase shifters.

6. A mass flowmeter as set forth in claim 5, wherein the phase shifters for the sensor signals each include an operational amplifier.

7. A mass flowmeter as set forth in claim 6, wherein the outputs of the operational amplifiers are summed in a summing amplifier whose output is applied to a Schmitt shaper which yields pulses at a rate in accordance with the frequency of the tuning fork to produce said frequency signal for said microcontroller.

8. A mass flowmeter as set forth in claim 7, wherein the output of said summing amplifier provides said amplitude signal for said controller.

9. A mass flowmeter as set forth in claim 7, wherein the output of said Schmitt shaper is applied to a phase-locked loop which in conjunction with a counter acts to adjust the phase shift of the phase shifters to maintain a desired phase relationship between the sensor signals.

10. A mass flowmeter as set forth in claim 1, wherein said frequency signal is a function of fluid density and wherein said microcontroller is adapted in response thereto to calculate the density of the fluid.

* * * * *